(12) United States Patent
Kameda et al.

(10) Patent No.: US 10,710,331 B2
(45) Date of Patent: Jul. 14, 2020

(54) VEHICLE INTERIOR COMPONENT AND METHOD OF PRODUCING THE SAME

(71) Applicant: TOYOTA BOSHOKU KABUSHIKI KAISHA, Aichi-ken (JP)

(72) Inventors: Nobuhiro Kameda, Gifu-ken (JP); Kenichi Kamura, Saga-ken (JP); Atsushi Miyake, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 193 days.

(21) Appl. No.: 16/029,872

(22) Filed: Jul. 9, 2018

(65) Prior Publication Data

US 2019/0030858 A1 Jan. 31, 2019

(30) Foreign Application Priority Data

Jul. 31, 2017 (JP) .................. 2017-147559

(51) Int. Cl.
```
B32B 37/00      (2006.01)
B32B 7/08       (2019.01)
B26F 1/24       (2006.01)
B60R 13/02      (2006.01)
B32B 3/26       (2006.01)
B32B 27/08      (2006.01)
B32B 37/18      (2006.01)
B32B 38/00      (2006.01)
```
(52) U.S. Cl.
CPC .................. *B32B 7/08* (2013.01); *B26F 1/24* (2013.01); *B32B 3/266* (2013.01); *B32B 27/08* (2013.01); *B32B 37/182* (2013.01); *B32B 38/0004* (2013.01); *B60R 13/0206* (2013.01); *B32B 37/0023* (2013.01); *B32B 2605/003* (2013.01); *B60R 13/0243* (2013.01)

(58) Field of Classification Search
CPC ..... Y10T 428/24281; Y10T 428/24289; Y10T 428/24339; B60R 13/02; B60R 13/0206; B60R 13/0243; B32B 7/08; B32B 3/266; B32B 27/08; B32B 37/182; B32B 37/0023; B32B 38/0004; B32B 2605/003
See application file for complete search history.

(56) References Cited

U.S. PATENT DOCUMENTS 1,980,489 A * 11/1934 Leopold .................. B60R 13/02
160/237

FOREIGN PATENT DOCUMENTS

JP          5585309          9/2014

* cited by examiner

*Primary Examiner* — Alexander S Thomas
(74) *Attorney, Agent, or Firm* — Greenblum & Bernstein, P.L.C.

(57) ABSTRACT

A vehicle interior component includes a board base and a skin. The board base includes a first surface to be on an interior side of a vehicle and a second surface to be on an exterior side of the vehicle when the vehicle interior component is installed in the vehicle. The board base includes a component mounting portion including a through hole extending through the board base and openings in the first surface and the second surface. The skin covers the first surface of the board base and includes flaps and a communication hole. The flaps are folded along an inner peripheral wall of the component mounting portion. The communication hole is defined by creases of the flaps and undersized relative to the mounting hole by a thickness of the skin.

4 Claims, 7 Drawing Sheets

VEHICLE INTERIOR COMPONENT AND METHOD OF PRODUCING THE SAME

CROSS REFERENCE TO RELATED APPLICATION

This application claims priority from Japanese Patent Application No. 2017-147559 filed on Jul. 31, 2017. The entire contents of the priority application are incorporated herein by reference.

TECHNICAL FIELD

The present disclosure relates to a vehicle interior component and a method of producing the vehicle interior component.

BACKGROUND

In a vehicle, a component may be fixed to a synthetic resin component via a hole. The synthetic resin component having a design surface may include a notch at a center of a hole that is to be formed on a back surface opposite from the design surface and surrounding walls that protrudes from the back surface to surround at least parts of the notch. The surrounding walls are curved to define a round area having a diameter greater than an outer diameter of a drill. The notch and the surrounding walls may function as aids for positioning the drill.

In recent years, demands for improving quality in appearance of interiors of vehicles are increasing. Surfaces of bases of interior components of vehicles may be covered with skins. To form holes in the interior components, holes need to be formed not only in the bases but also in the skins.

To form a hole in an interior component, a mounting hole may be formed in a base of the interior component and a skin is placed over an interior-side surface of the base and a communication hole may be formed in the skin to communicate with the mounting hole. If the communication hole is formed in the skin by cutting out an area of the skin covering the mounting hole, residues may be produced. The residues may unexpectedly enter a space between the interior component and a component to be fixed to the interior component. The residues may become obstacles for the fixing of the component to the interior component. Furthermore, if the communication hole is formed in size that does not fit the mounting hole, parts of the skin may be caught between the interior component and the component to be fixed and thus the component may not be properly fixed to the interior component.

SUMMARY

The present invention was made in view of the foregoing circumstances. An object is to provide a vehicle interior component with assembly reliability and a method of producing the vehicle interior component.

A vehicle interior component includes a board base and a skin. The board base includes a first surface, a second surface, and a component mounting portion. The first surface is on an interior side of a vehicle and the second surface is on an exterior side of the vehicle when the vehicle interior component is installed in the vehicle. The component mounting portion includes a through hole that extends through the board based and openings in the first surface and the second surface. The skin covers the first surface of the board base. The skin includes flaps and a communication hole. The flaps are folded along an inner peripheral wall of the mounting hole. The communication hole is defined by creases of the flaps and undersized relative to the mounting hole by a thickness of the skin.

The communication hole of the skin is defined by the creases of the flaps and undersized relative to the mounting hole only by the thickness of the skin. Although the skin does not include a cutout along the hole edge in the component mounting portion, the skin includes the communication hole that fits the through hole in the component mounting portion. The skin is less likely to be caught between the board base and a component when the component is fixed to the board base. According to the communication hole, residues are less likely to be produced during the formation of the communication hole and reliability in the fixing of the component to the board base improves.

A method of producing a vehicle interior component including: forming a through hole in a board base of the vehicle interior component to extend through the board base in a direction from a first surface of the board base to a second surface of the board base with openings in the first surface of the board base and the second surface of the board base; bonding a skin to the first surface of the board base; holding a cross head of a composite tool against a section of the skin covering the through hole of the board base, wherein the composite tool including a shaft having an cross section with a contour corresponding to a contour of the mounting hole and the cross head including four blades protruding form an end surface of the shaft; moving the composite tool in a direction from the first surface of the board base to the second surface of the board base until the cross head of the composite tool penetrates the section of the skin and the section is divided into the flaps; and moving the composite tool until the shaft is inserted into the through hole and the flaps are folded along the inner peripheral wall of the through hole toward the opening of the through hole in the second surface of the board base.

According to the method, the communication hole that fits the mounting hole of the board base is formed in the skin without cutting out the section of the skin covering the mounting hole. Therefore, the skin is less likely to be caught between the board base and the component when the component is mounted to the board base. Furthermore, residues are less likely to be produced during the formation of the communication hole in the skin. Therefore, assembly reliability of the vehicle interior component improves.

DETAILED DESCRIPTION

An embodiment will be described with reference to FIGS. 1 to 7. First, a door trim 10, which is a vehicle interior component, will be described. The right side and the left side in FIG. 2 correspond to an exterior side and an interior side of the vehicle, respectively.

Figure 1:
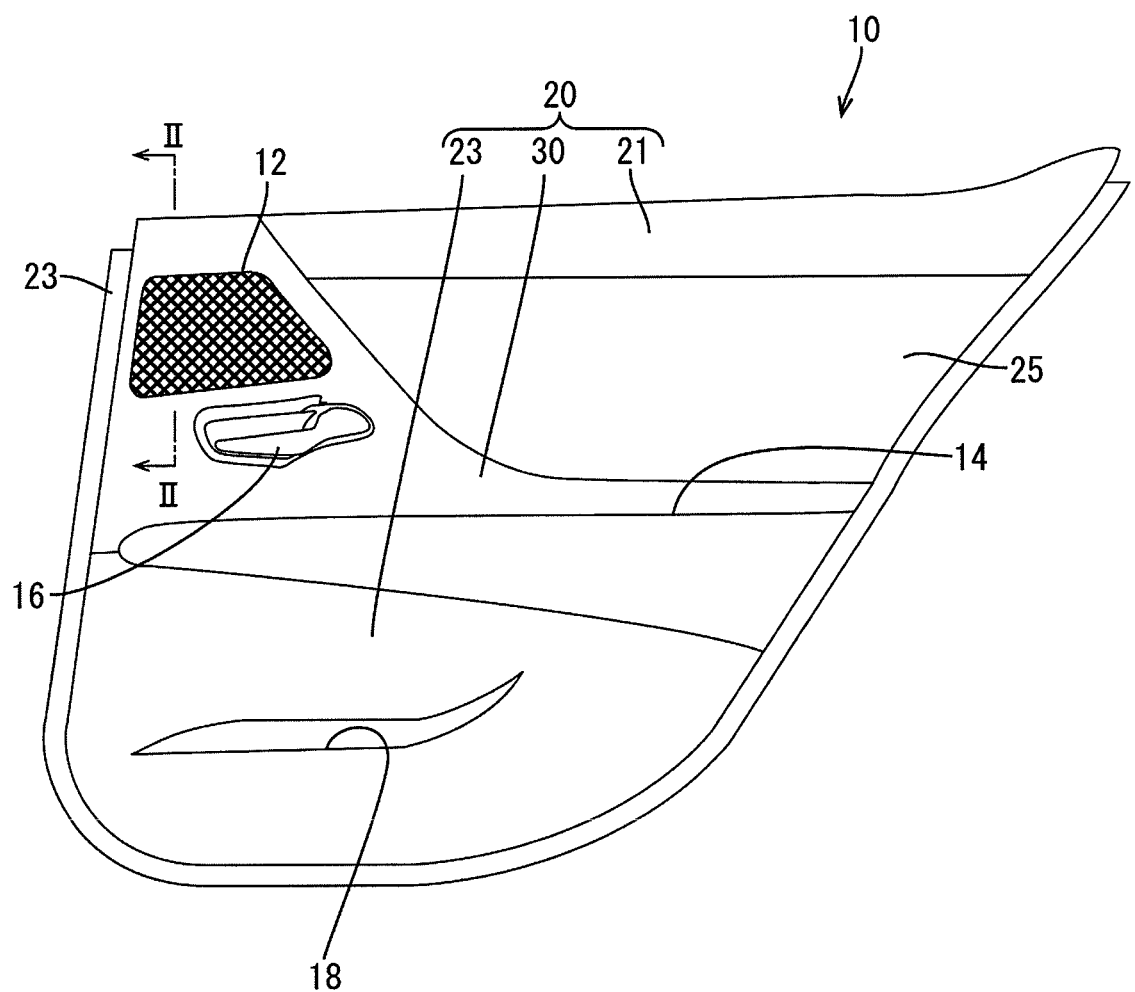
FIG. 1 is an elevated view of a door trim.

As illustrated in FIG. 1, the door trim 10 includes a trim board 20 that includes an upper board 21, a lower board 23, and a middle board 30. The upper board 21 forms an upper portion of the door trim 10. The lower board 23 forms a lower portion, a front edge portion, and a rear edge portion of the door trim 10. The middle board 30 forms a middle portion of the door trim 10 between the upper board 21 and the lower board 23. An armrest 14 is provided at a boundary between the middle board 30 and the lower board 23. An ornament 25 is disposed above the armrest 14. Furthermore, the lower board 23 includes a door pocket 18. An inside door handle 16 and a speaker grille 12 are fixed to the middle board 30. The speaker grille 12 is an example of a component to be fixed to a board base.

Figure 2:
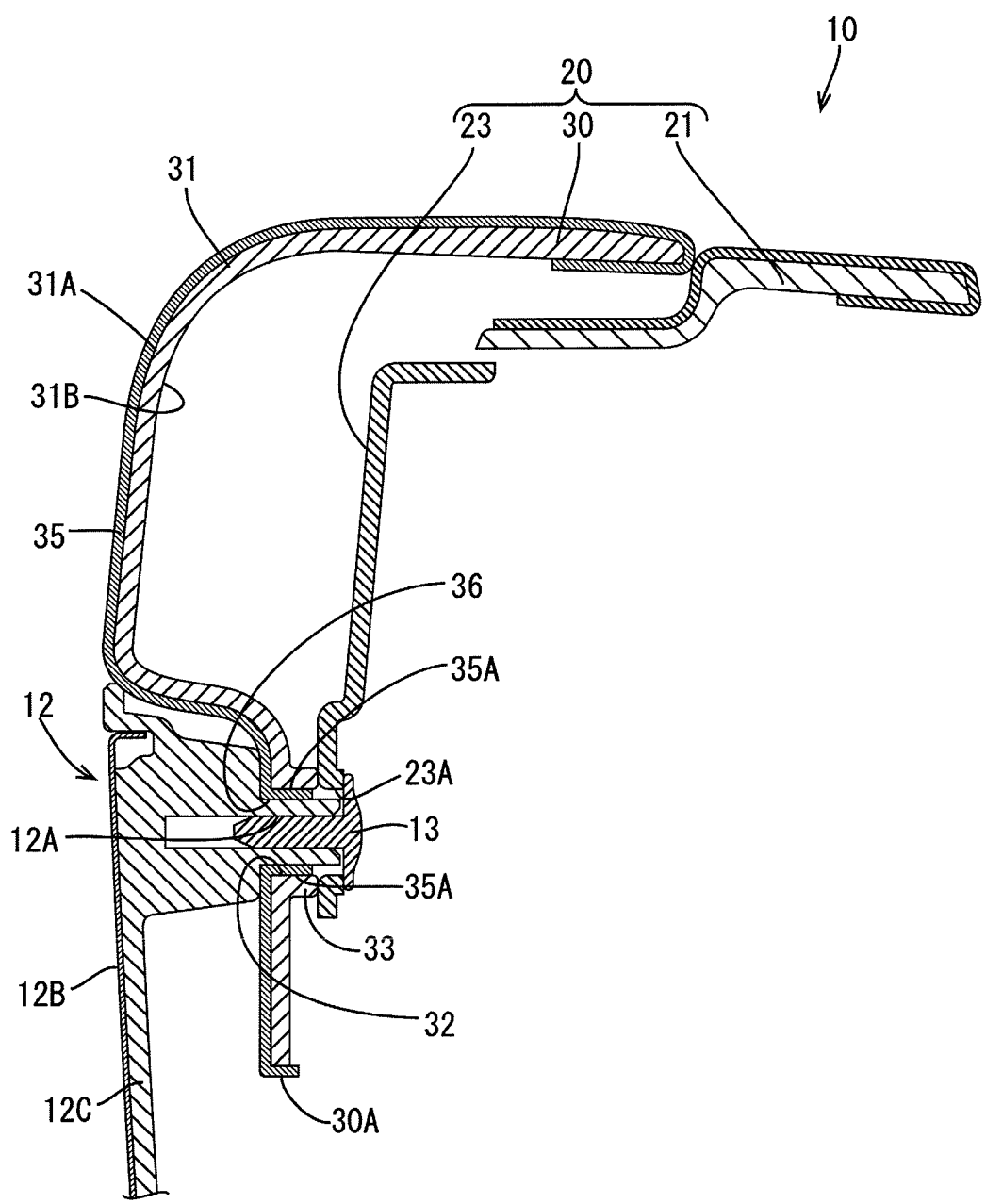
FIG. 2 is a cross-sectional view illustrating assembly of the door trim and a speaker grille along line II-II in FIG. 1.

As illustrated in FIG. 2, the speaker grille 12 having a quadrilateral shape includes a base portion 12C, a grille portion 12B, and mounting bosses 12A. The grille portion 12B includes pine holes. The mounting bosses 12A are disposed at the four corners of the speaker grille 12, respectively. Each mounting boss 12A protrudes from the base portion 12C toward the exterior side of the vehicle and includes a hollow that extends in the height direction of the mounting boss 12A.

As illustrated in FIG. 2, the middle board 30 includes a board base 31 and a skin 35. The board base 31 includes a first surface to be on the interior side of the vehicle and a second surface to be on the exterior side of the vehicle when the door trim 10 is installed in the vehicle. The first surface and the second surface of the board base 31 will be referred to as a first base surface 31A and a second base surface 31B, respectively. The skin 35 has a first surface to be on the interior side of the vehicle and a second surface to be on the exterior side of the vehicle when the door trim 10 is installed in the vehicle. The first surface and the second surface of the skin 35 will be referred to as a first skin surface and a second skin surface, respectively. The second skin surface of the skin 35 is bonded to the first base surface 31A of the board base 31 with an adhesive to cover the first base surface 31A.

Figure 3:
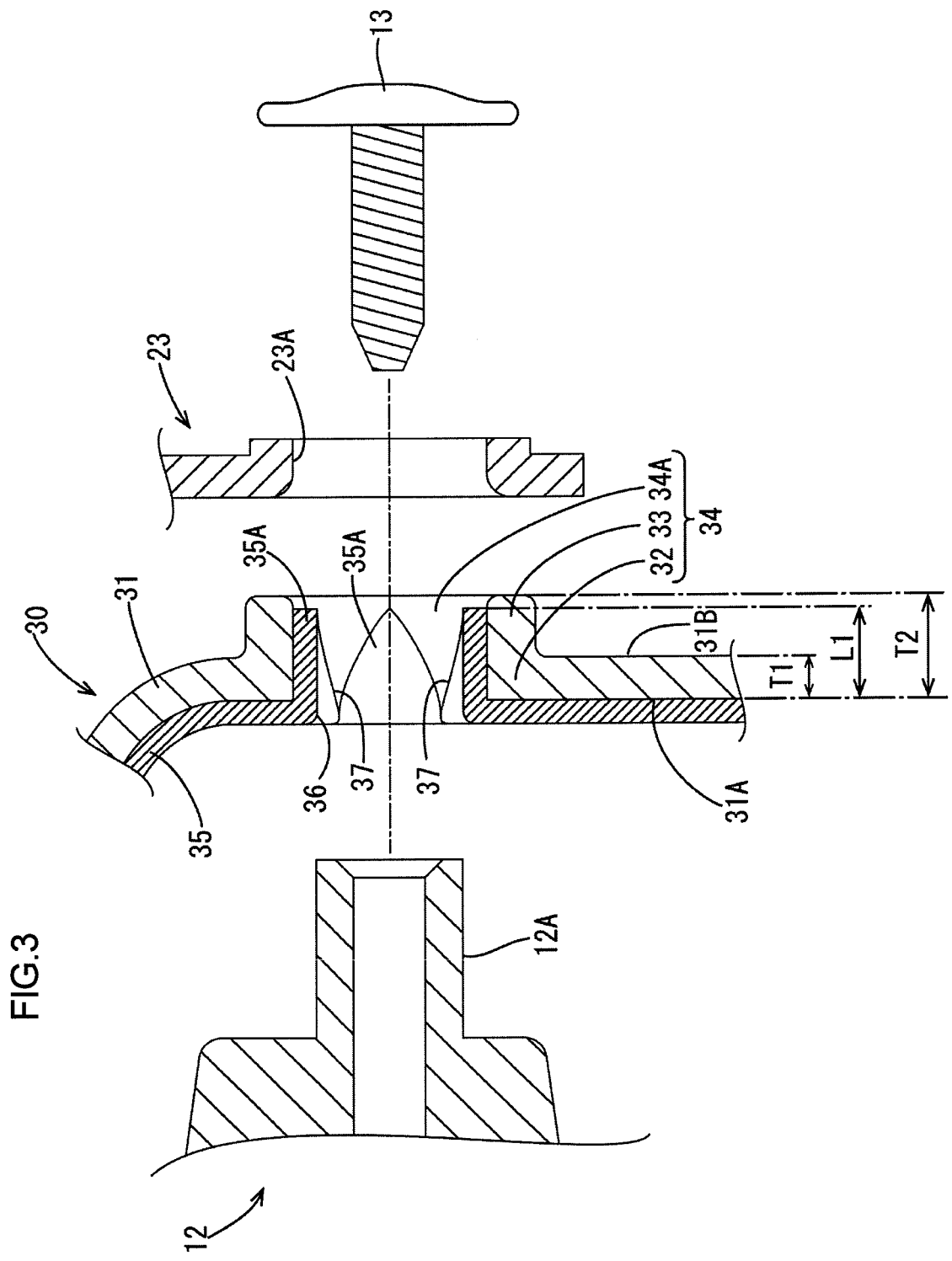
FIG. 3 is an exploded cross-sectional view illustrating the assembly in FIG. 2.

As illustrated in FIG. 3, the board base 31 includes component mounting portions 34. Each component mounting portion 34 is composed of a base section 32 and a tubular section 33. The base section 32 includes a through hole that extends through the board base 31 in the thickness direction of the board base 31 and openings in the first base surface 31A and the second base surface 31B. The tubular section 33 protrudes from the base section 32 toward the exterior side of the vehicle, that is, protrudes from the second base surface 31B of the board base 31 around the opening in the second base surface 31B. The component mounting portion 34 includes a mounting hole defined by an inner peripheral wall 34A that is composed of an inner peripheral wall of the base section 32 and an inner peripheral wall of the tubular section 33. The board base 31 includes a speaker mounting hole 30A inside a rectangle area that is defined by the component mounting portions 34. The speaker mounting hole 30A is provided for mounting a speaker.

To fix the speaker grille 12 to the middle board 30, the mounting bosses 12A are inserted in the component mounting portions 34 of the middle board 30 from the interior side of the vehicle and screws 13, which are example of fixing members, are screwed into the mounting bosses 12A from the exterior side of the vehicle until shanks of the screws 13 are engaged with inner peripheral walls of the respective mounting bosses 12A. The base portion 12C is disposed parallel to the board base 31 and opposed to the first base surface 31A of the board base 31. In the following paragraphs, one of the mounting bosses 12A at the front upper corner will be described in detail and the rest of the mounting bosses 12A will not be described in detail.

The base board 31 will be described in more detail. The board base 31 is a board-shaped member made of synthetic resin such as polypropylene or material including synthetic resin and fibers (bast fibers such as kenaf fibers) mixed together. The board base 31 is prepared through injection-molding. A method of preparing the board base 31 will be described later. The board base 31 includes suction holes for vacuum-forming the skin 35.

Figure 5A:
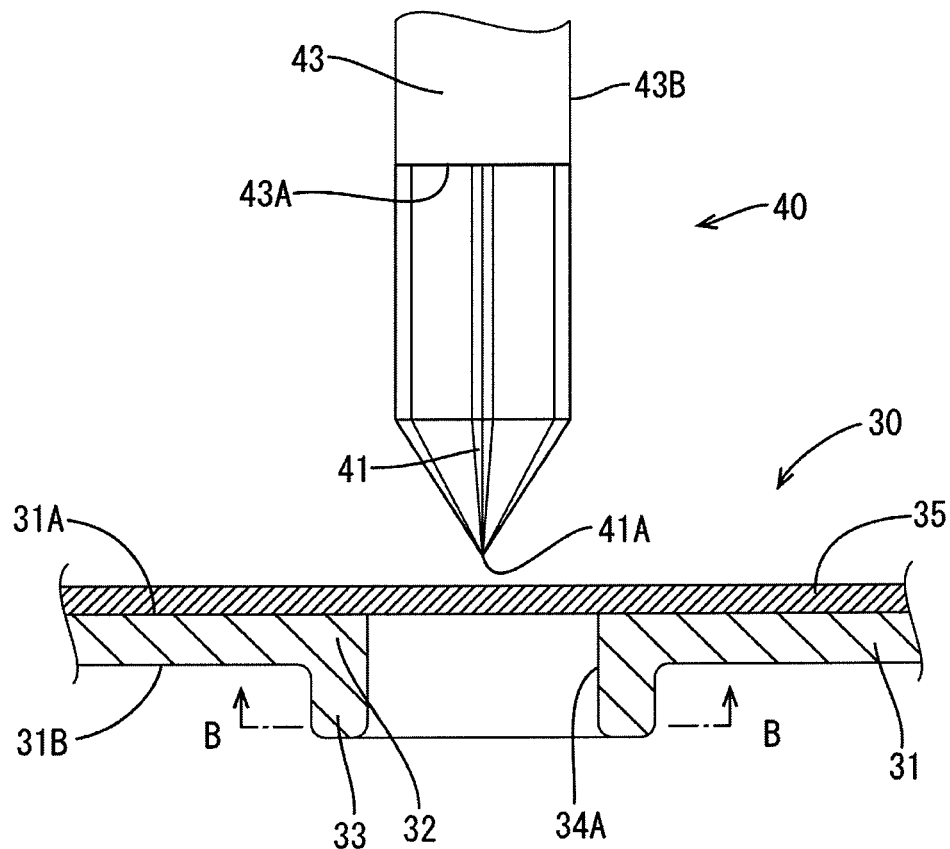
FIGS. 5A and 5B are schematic views illustrating a board base, a skin, and the composite tool before a cutting step is performed.
Figure 5B:
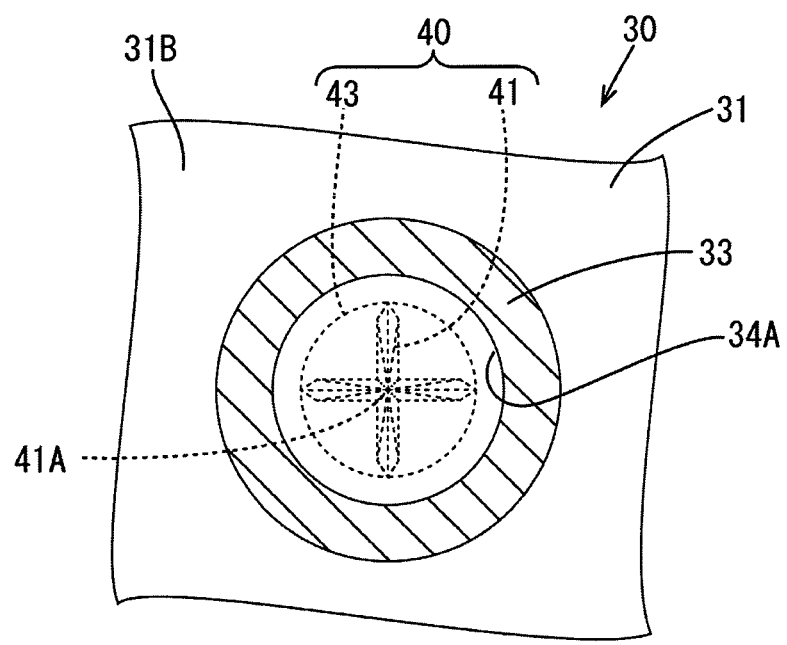

As illustrated in FIGS. 5A, and 5B, the inner peripheral wall 34A has a circular shape in a plan view. As illustrated in FIG. 3, the through hole in the base section 32 has a depth in a thickness direction of the board base 31 and the inner peripheral wall 34A has a height in the interior-exterior direction of the vehicle. Each mounting boss 12A has an outer perimeter undersized relative to an inner perimeter of the component mounting portion 34. Namely, an inner diameter of the component mounting portion 34 is greater than an outer diameter of the mounting boss 12A by twice the thickness of the skin 35 (about 1 to 2 mm). The mounting boss 12A is inserted in the component mounting portion 34 and thus displacement of the mounting boss 12A in the radial direction of the component mounting portion 34 is restricted. Furthermore, because the mounting boss 12A is fixed to the middle board 30 with the screw 13, a section of the speaker grille 12 around the base of the mounting boss 12A is held against a hole edge of the mounting hole in the component mounting portion 34. Therefore, displacement of the mounting boss 12A in the height direction thereof is restricted.

The tubular section 33 includes an annular distal end surface that is parallel to the second base surface 31B of the board base 31. The distal end surface of the tubular section 33 may be referred to as a fastening surface fasten on the lower board 23 with the screw 13. The mounting boss 12A at the front upper corner of the speaker grille 12, the middle board 30, and the lower board 23 are fasten together with the screw 13. A hole edge of a lower board-side mounting hole 23A in the lower board 23 is disposed between the distal end surface of the tubular section 33 and a head of the screw 13. The mounting bosses 12A at other corners may not be fastened together with the lower board 23 or may be fastened together with other component.

The skin 35 is a sheet made of synthetic resin such as olefinic elastomer and polyvinyl chloride. The skin 35 includes a cushion layer. Namely, the skin 35 is thickish and soft. The skin 35 is shaped along the first base surface 31A of the board base 31 through vacuum forming. A method of shaping the skin 35 will be described later.

As illustrated in FIG. 3, the skin 35 includes flaps 35A and communication holes 36 that communicate with the mounting holes of the component mounting portions 34, respectively. Each set of the flaps 35A is formed by dividing a section of the skin 35 covering the opening in the base section 32 of the corresponding component mounting portion 34 with slits 37 that radially extend from the center of the section. The flaps 35A are folded along the inner peripheral wall 34A of the corresponding component mounting portion 34. Each communication hole 36 is defined by creases of the flaps 35A to communicate with the mounting hole of the component mounting portion 34. The communication hole 36 is undersized relative to the mounting hole by the thickness of the skin 35. A method of forming the communication hole 36 will be described later.

Figure 6A:
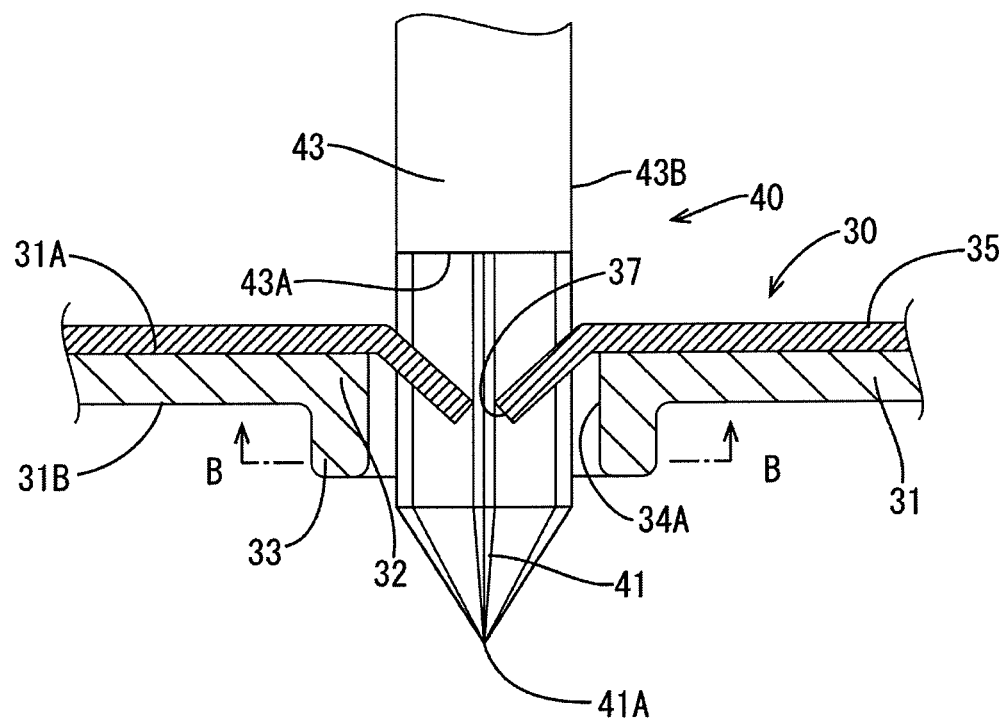
FIGS. 6A and 6B are schematic views illustrating the cutting step.
Figure 6B:
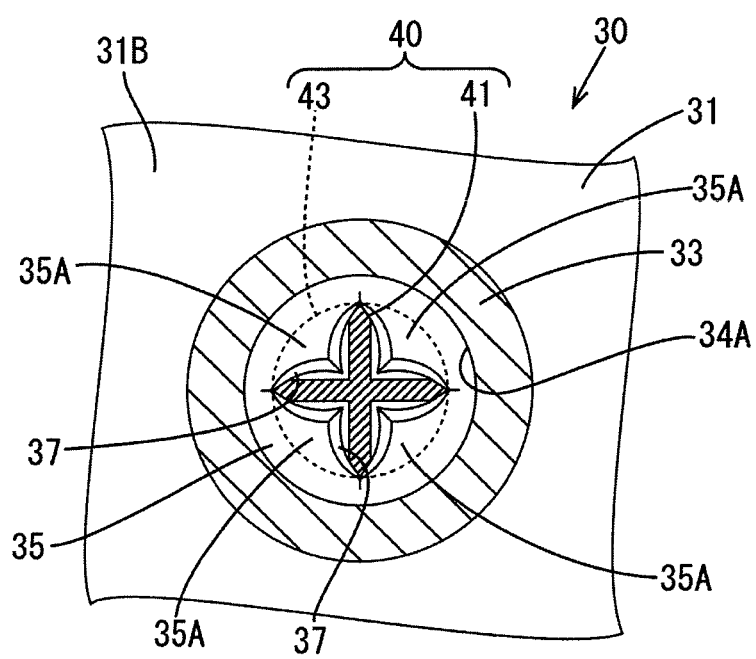

As illustrated in FIGS. 3, 6A, and 6B, each of the flaps 35A is a circular sector with an arc along the inner peripheral wall 34A and a center angle of 90 degrees. Each section of the skin 35 overlapping the opening in the base section 32 includes four flaps 35A. Each flap 35A is straight up along the inner peripheral wall 34A in the height direction of the inner peripheral wall 34A. Each flap 35A is curved along the inner peripheral wall 34A in the circumferential direction of the component mounting portion 34. The flaps 35A are partially or entirely bonded to the inner peripheral wall 34A with adhesives.

As illustrated in FIG. 3, the base section 32 has a height T1 and the component mounting portion 34 has a height T2. The height T1 is about 2 to 2.5 mm and the height T2 is about 4.5 to 7 mm (T2>T1). The inner diameter of the component mounting portion 34 is about 8 to 9 mm. The dimension L1 of each flap 35A between the bottom of the component mounting portion 34 and the tip of the flap 35A, which is about equal to a radius of the through hole of the component mounting portion 34, is about 4 to 4.5 mm. The dimensions described above may be altered as appropriate.

If the board base 31 does not include the tubular section 33, the depth of a mounting hole formed in the board base 31 is equal to the height T1. The dimension L1 of each flap 35A is greater than the height T1 (L1>T1) and thus the flaps 35A that are bent toward the exterior side project from the mounting hole. Because the projected sections of the flaps 35A are not supported by the inner peripheral wall of the mounting hole, the flaps 35A are less likely to be held in proper positions and to be properly shaped. The shaping of the flaps 35A will be described in detail later. Each flap 35A in this embodiment has the dimension L1 that is less than the height T2 of the component mounting portion 34 (L1<T2). When the flaps 35A are bent toward the exterior side of the vehicle, the flaps 35A remain within the component mounting portion 34. Therefore, the flaps 35A are properly supported by the inner peripheral wall 34A and maintained in the proper positions. Furthermore, the flaps 35A are properly shaped.

The mounting boss 12A is inserted into the mounting hole of the component mounting portion 34 via the communication hole 36 and then into the lower board-side mounting hole 23A until the distal end surface of the mounting boss 12A is flush with a surface of the lower board on the exterior side of the vehicle or slightly shy of the surface (see FIG. 2). An overlapping allowance of the mounting boss 12A relative to the board base 31 is about equal to a sum of the height T2 and the thickness of the lower board 23. If the lower board 23 is not fasten together with the speaker grille 12 and the middle board 30, the distal end of the mounting boss 12A may be on the same plane on which the second base surface 31B of the board base 31 is located or slightly shy of the plane. The overlapping allowance of the mounting boss 12A relative to the board base 31 may be about equal to the height T2.

A method of producing the door trim 10 will be described. The method includes a base preparing process, a skin shaping process, a hole forming process, and a fixing process. The base preparing process is for preparing the board base 31. The skin shaping process is for shaping the skin 35 along the first base surface 31A of the board base 31. The hole forming process is for forming the communication hole 36 in the skin 35. The fixing process is for fixing the speaker grille 12 to the middle board 30.

In the base preparing process, the board base 31 is prepared through injection molding using a set of molds. The molds are closed and a molten resin is injected into a forming cavity inside the molds. The molds include forming surfaces corresponding to the inner peripheral walls 34A of the component mounting portions 34. After the molten resin in the forming cavity is cooled and hardened, the molds are opened and the board base 31 is removed from the molds. The board base 31 prepared as described above includes the component mounting portions 34 that include the base sections 32 and the tubular sections 33. Suction holes are drilled in the board base 31 after the injection molding.

In the skin shaping process, the skin is shaped through vacuum forming using vacuum forming die. The board base 31 is placed on the vacuum forming die and an adhesive is sprayed onto the first base surface 31A of the board base 31. The adhesive is also applied to at least parts of the inner peripheral walls 34A of the component mounting portions 34. The skin 35 is heated and softened. The skin 35 that is heated and softened is placed on the board base 31 and negative pressure is applied to the skin 35 via the suction holes to stick the skin 35 onto the first base surface 31A of the board base 31. Through the process, the skin 35 is shaped along the first base surface 31A of the board base 31.

The hole forming process includes a cutting step and a flap shaping step that are performed using a composite tool 40. The composite tool 40 is used for both the cutting of the skin 35 and the shaping of the flaps 35A. The term shaping means that the shape of the flaps 35A is permanently altered from their original shape in the natural state so as not to return to the original shape.

Figure 4:
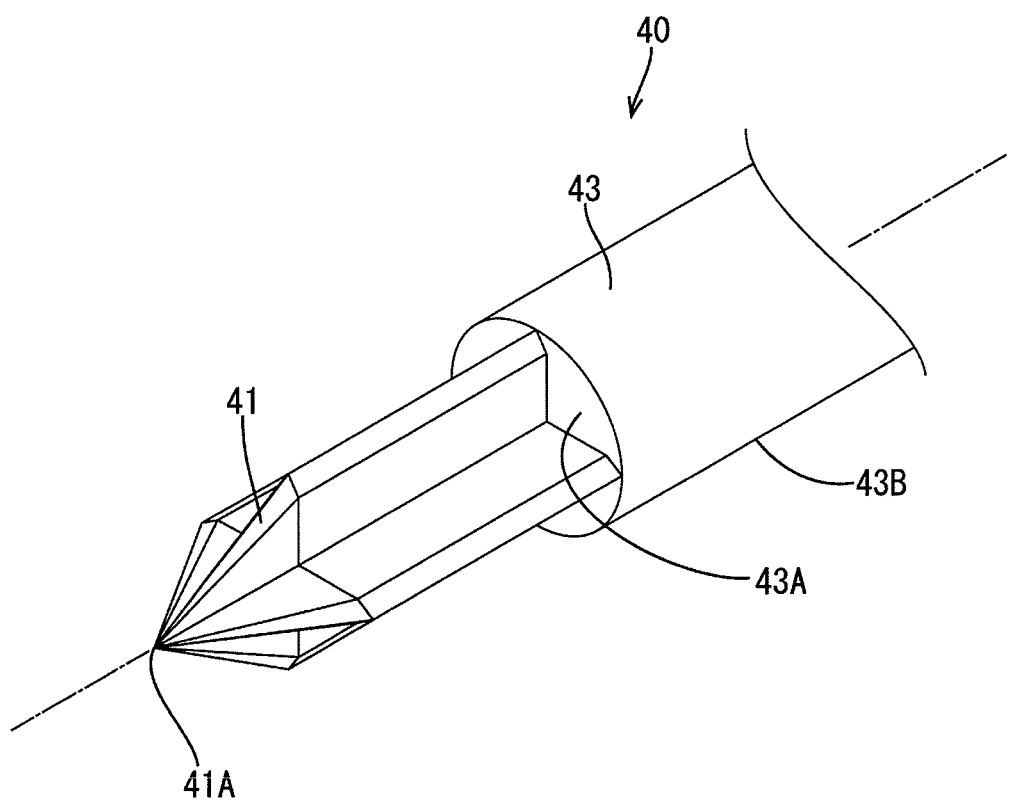
FIG. 4 is a perspective view of a composite tool.

As illustrated in FIG. 4, the composite tool 40 includes a shaft 43 and a cross head 41. The shaft 43 can be inserted into the mounting holes of the component mounting portions 34. The cross head 41 protrudes from an end surface of a first end 43A of the shaft 43. The cross head 41 includes four blades that are disposed about the axis of the shaft 43 to form a cross shape in a cross-sectional view and tapered toward their tips. The tips of the blades are coupled to form a tip 41A of the composite tool 40. In FIG. 4, the axis is illustrated with a chain line. A cross section of the shaft 43 perpendicular to the axis has a diameter slightly less than the diameter of the communication hole 36, that is, slightly less than the inner diameter of the component mounting portion 34. Therefore, the flaps 35A can be sandwiched between an outer peripheral wall 43B of the shaft 43 and the inner peripheral wall 34A of the component mounting portion 34.

The shaft 43 and the cross head 41 are integrally formed and provided as a metal rod-shaped single member. A second end of the shaft 43 is held in a holder. The composite tool 40 is held in a position with the axis perpendicular to the first skin surface and moved in a direction from the first skin surface to the second skin surface or from the second skin surface to the first skin surface to penetrate the skin 35.

As illustrated in FIG. 6A, in the cutting step, the tip 41A of the cross head 41 is held against the first skin surface of the skin 35 at the center of a section of the skin 35 covering the mounting hole of the component mounting portion 34. The cross head 41 is pushed in the direction from the first skin surface to the second skin surface and inserted into the tubular section 33. With the blades, the cross head 41 penetrates the section of the skin 35 to form a cross-cut that includes four slits 37 in the section of the skin 35 about the center of the section with ends of the cross-cut located closer to the hole edge of the base section 32. Namely, the section of the skin 35 is divided into four flaps 35A. This is the end of the cutting step.

Figure 7A:
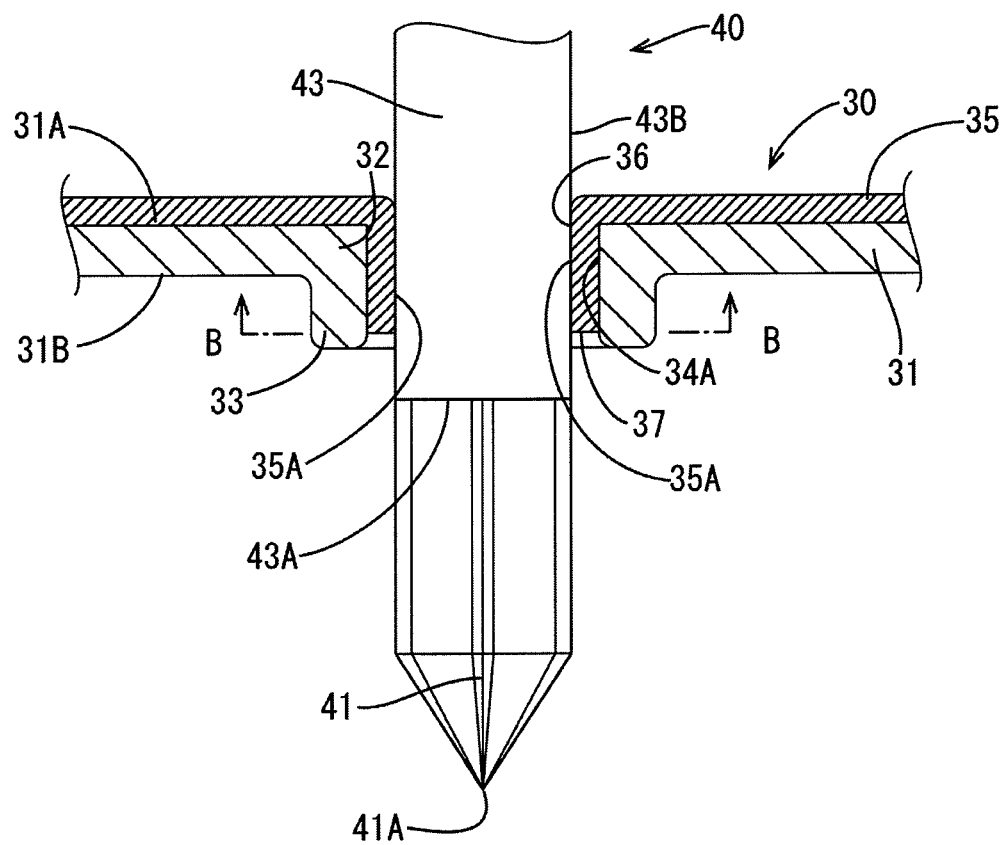
FIGS. 7A and 7B are schematic views illustrating a flap shaping step.
Figure 7B:
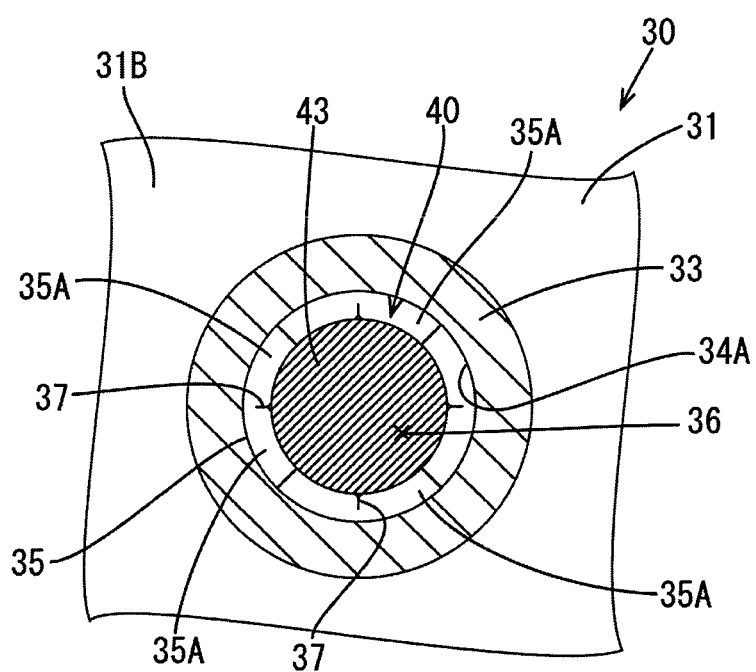

As illustrated in FIGS. 7A and 7B, in the flap shaping step, the composite tool 40 is moved in the direction from the first skin surface to the second skin surface to insert the shaft 43 into the tubular section 33 until the flaps 35A are folded along the inner peripheral wall 34A and shaped. More specifically, the composite tool 40 is further moved from the position in the cutting step to push the flaps 35A toward the tubular section 33 with the end surface of the first end 43A until the flaps 35A are disposed inside the component mounting portion 34 and pressed against the inner peripheral wall 34A with the outer peripheral wall of the shaft 43. The shaft 43 shapes the flaps 35A along the inner peripheral wall 34A. Because the composite tool 40 is moved in the direction that corresponds with the folding direction of the flaps 35A, the skin 35 is less likely to be wrinkled or twisted due to the shaping of the flaps 35A. The flaps 35A are bonded to the sections of the inner peripheral wall 34A to which the adhesive is applied. When the first end 43A of the shaft 43 is passed through the tubular section 33, the shaping of the flaps 35A is complete. This is the end of the flap shaping step.

The composite tool 40 is moved in the direction from the first skin surface to the second skin surface until the cross head 41 is taken out of the component mounting portion 34. The flaps 35A remain in the shape even when no force is applied to the flaps 35A with the composite tool 40. The communication hole 36 that has a size that fits the mounting hole of the component mounting portion 34 is formed in the skin 35.

In the fixing process, the mounting bosses 12A of the speaker grille 12 are inserted into the component mounting portion 34 via the communication holes 36 (see FIGS. 2 and 3). Even if the speaker grille 12 is unexpectedly tilted relative to the middle board 30, the mounting bosses 12A are caught by the tubular sections 33 and less likely to come out of the base section 32. Furthermore, the mounting bosses 12A are inserted into the lower board-side mounting holes 23A. The screws 13 are screwed into the mounting bosses 12A from the lower board 23 side, respectively. The fixing of the speaker grille 12 to the board base 31 is complete. The middle board 30 with the speaker grille 12 fixed thereto is prepared. Other components of the trim board 20 may be fixed and the preparation of the door trim 10 is complete.

According to the flap shaping step in the method of producing the door trim 10, the communication holes 36 having the size that fits the mounting holes of the component mounting portions 34 are formed without cutting out sections of the skin 35 along the hole edges in the component mounting portions 34. Therefore, the skin 35 is less likely to bother the mounting bosses 12A for mounting the speaker grille 12 to the middle board 30 and residues that may be produced if the cutting-out of the sections of the skin 35 is performed is less likely to be produced. This improves reliability in fixing of the speaker grille 12 to the door trim 10.

According to the flap shaping step, the flaps 35A are shaped along the inner peripheral wall 34A of the component mounting portion 34 with the shaft 43. Because the inner peripheral wall 34A has the sufficient height, the flaps 35A can be properly shaped in the flap shaping step. Furthermore, the mounting bosses 12A have the sufficient overlapping allowance relative to the board base 31 and thus the mounting bosses 12A are less likely to come out of the base sections 32.

According to the skin cutting process, each section of the skin 35 covering the mounting hole of the corresponding component mounting portion 34 is divided into four flaps 35A with the four blades of the composite tool 40 even if the skin 35 has toughness. In comparison to a method in which each section of the skin 35 is divided into three flaps, the creases of the flaps 35A can be more easily formed along the hole edge in the base section 32. In comparison to a configuration in which each section of the skin 35 is divided into five flaps, dividing of the section into four flaps 35A requires less pressure.

Although the skin 35 does not include cutouts along the hole edges in the component mounting portions 34, the skin 35 is less likely to bother the mounting bosses 12A during the mounting of the speaker grille 12 to the middle board 30 because the mounting bosses 12A are inserted in the component mounting portions 34 via the communication holes 36 that are defined by the creases of the flaps 35A. Because the communication holes 36 are not formed by cutting out the sections of the skin 35, residues are less likely to be produced and thus the reliability in the fixing of the speaker grille 12 to the door trim 10 improves. Furthermore, the mounting bosses 12A have the sufficient overlapping allowance relative to the board base 31 and thus the mounting bosses 12A are less likely to be unexpectedly taken out of the base sections 32.

The flaps 35A are bent with larger angles in comparison to a configuration in which tubular sections protrude from the first base surface of the base and the flaps are bent along the inner peripheral wall of the tubular sections. Therefore, the flaps 35A can be more easily shaped.

Other Embodiments

The technology described herein is not limited to the embodiment described in the above description and the drawings. The technology described herein may include the following embodiments.

(1) The technology described herein may be applied to instrument panels and quarter trims of vehicle and interior components of vessels and aircrafts.

(2) The technology described herein may be applied to other types of interior components such as design panels for decorating interiors of vehicles and boards to form other sections of trim boards. The arrangements, the shapes, and sizes of the holes are not limited to those described above.

(3) The technology described herein may be applied to mounting bosses fixed to base sections of mounting holes through thermoplastic staking or ultrasonic staking. Other than the mounting bosses 12A, the technology described herein may be applied to a configuration in which shafts of fixing members for fixing another component to a vehicle interior component are inserted in component mounting portion of the vehicle interior component.

(4) The technology described herein may be applied to component mounting portions that include base sections having a sufficient depth for shaping the flaps but not include tubular sections or to a base that include tubular sections that protrude from a surface of the base to be on an interior side of a vehicle.

(5) The technology described herein may be applied to a method that includes forming communication holes in a skin with a composite tool that includes a Y-shaped head with three blades or a composite tool that includes five or more blades. The technology described herein may be applied to a method that includes forming communication holes in a skin with a composite tool that includes a shaft that has a cross section corresponding to a hole edge of a component mounting portion (e.g., a D-shaped cross section).

(6) The technology described herein may be applied to a method of producing a vehicle interior component including manually bonding a genuine leather skin to a base rather than through the vacuum forming. The technology described herein may be applied to a configuration in which flaps of a skin are not bonded to an inner peripheral wall of a component mounting portion.

The invention claimed is:

1. A method of producing a vehicle interior component, the method comprising:
   forming a through hole in a board base of the vehicle interior component to extend through the board base in a direction from a first surface of the board base to a second surface of the board base with openings in the first surface of the board base and the second surface of the board base;
   bonding a skin to the first surface of the board base;
   holding a cross head of a composite tool against a section of the skin covering the through hole of the board base, wherein the composite tool including a shaft having an cross section with a contour corresponding to a contour of a mounting hole of a component mounting portion to be formed and the cross head including four blades protruding from an end surface of the shaft;
   moving the composite tool in a direction from the first surface of the board base to the second surface of the board base until the cross head of the composite tool penetrates the section of the skin and the section is divided into the flaps; and
   moving the composite tool until the shaft is inserted into the through hole and the flaps are folded along the inner peripheral wall of the through hole toward the opening of the through hole in the second surface of the board base.

2. The method according to claim 1, further comprising:
   forming a tubular section to protruded from the second surface of the board base around the through hole to form the component mounting portion including a mounting hole defined by an inner peripheral wall of the component mounting portion composed of the inner peripheral wall of the through hole and an inner peripheral wall of the tubular section; and
   moving the composite tool until the shaft is inserted into the tubular section and the flaps are folded along the inner peripheral wall of the component mounting portion toward an opening of the tubular section in a distal end surface of the tubular section.

3. The method according to claim 2, wherein
   the blades of the cross head are tapered toward tips thereof and connected together to form a tip of the cross head,
   the tip of the composite tool is held against a center of the section of the skin covering the mounting hole of the component mounting portion, and
   the flaps are separated by slits radially extending from the center of the section.

4. The method according to claim 1, wherein
   the blades of the cross head are tapered toward tips thereof and connected together to form a tip of the cross head,
   the tip of the composite tool is held against a center of the section of the skin covering the mounting hole of the component mounting portion, and
   the flaps are separated by slits radially extending from the center of the section.

* * * * *